United States Patent [19]
Albrecht et al.

[11] Patent Number: 5,483,822
[45] Date of Patent: * Jan. 16, 1996

[54] CANTILEVER AND METHOD OF USING SAME TO DETECT FEATURES ON A SURFACE

[75] Inventors: Thomas Albrecht, San Jose; Marco Tortonese, Stanford; Robert Barrett, Mountain View, all of Calif.

[73] Assignee: The Board of Trustees of the Leland Stanford Junior University, Palo Alto, Calif.

[*] Notice: The portion of the term of this patent subsequent to Sep. 13, 2011, has been disclaimed.

[21] Appl. No.: 238,546

[22] Filed: May 5, 1994

Related U.S. Application Data

[63] Continuation of Ser. No. 954,695, Sep. 30, 1992, Pat. No. 5,345,815, which is a continuation of Ser. No. 638,163, Jan. 4, 1991, abandoned.

[51] Int. Cl.$^6$ ............................................. G01B 7/34
[52] U.S. Cl. ................................................. 73/105
[58] Field of Search ................. 73/105, 861.71–861.76, 73/DIG. 4, 862.639, 774, 777, 863.634; 33/561, 551, 553, 554; 250/306, 307

[56] References Cited

U.S. PATENT DOCUMENTS

| | | | |
|---|---|---|---|
| 4,106,333 | 8/1978 | Saljel et al. ............................. | 73/105 |
| 4,166,384 | 9/1979 | Matsuda et al. ........................ | 73/760 X |
| 4,359,892 | 11/1982 | Schnell et al. ......................... | 73/105 |
| 4,454,771 | 6/1984 | Shimazoe et al. ...................... | 73/777 X |
| 4,706,374 | 11/1987 | Murakami ............................... | 437/225 |
| 5,329,808 | 7/1994 | Elings et al. ............................ | 73/105 |
| 5,345,815 | 9/1994 | Albrecht et al. ........................ | 73/105 |

FOREIGN PATENT DOCUMENTS 0387906  9/1990  European Pat. Off. .

OTHER PUBLICATIONS

Transducers '91.1991 International Conference on Solid State Sensors and Actuators Digest of Technical Papers (cat. No. 91ch2817-5), San Francisco, Calif. USA, 24–27 Jun. 1991. "Atomic force microscopy using a peizoresistive cantilever" (M. Tortonese et al.), *pp. 448-451.

Transactions of the Institute of Electrical Engineers of Japan, Part C, vol. 122-C, No. 12, Dec. 1992, Japan Yonekubo et al "Contract type line sensor for examining surface topography" *abstract; figures* pp. 757-762.

(List continued on next page.)

*Primary Examiner*—Thomas P. Noland
*Attorney, Agent, or Firm*—Skjerven, Morrill, MacPherson, Franklin & Friel; David E. Steuber

[57] ABSTRACT

A microminiature cantilever structure is provided having a cantilever arm with a piezoresistive resistor embedded in at least the fixed end of the cantilever arm. Deflection of the free end of the cantilever arm produces stress in the base of the cantilever. That stress changes the piezoresistive resistor's resistance at the base of the cantilever in proportion to the cantilever arm's deflection. Resistance measuring apparatus is coupled to the piezoresistive resistor to measure its resistance and to generate a signal corresponding to the cantilever arm's deflection. The microminiature cantilever is formed on a semiconductor substrate. A portion of the free end of the cantilever arm is doped to form an electrically separate U-shaped piezoresistive resistor. The U-shaped resistor has two legs oriented parallel to an axis of the semiconductor substrate having a non-zero piezoresistive coefficient. A metal layer is deposited over the semiconductor's surface and patterned to form an electrical connection between the piezoresistive resistor and a resistance measuring circuit, enabling measurement of the piezoresistive resistor's resistance. Finally, the semiconductor substrate below said cantilever arm is substantially removed so as to form a cantilevered structure, and a tip is connected to the free end of the cantilever arm to facilitate the structure's use in an atomic force microscope.

7 Claims, 5 Drawing Sheets

OTHER PUBLICATIONS

IEEE Electron Device Letters., vol. 10, No. 11, Nov. 1989, New York US pp. 490–492 S. Akamine et al 'Microfabricated Scanning Tunneling Microscope'.

IEEE Transactions on Electron Devices, vol. ED–26, No. 12, Dec. 1979, New York US pp. 1911–1917 L. M. Roylance; J. B. Angell 'A Batch Fabricated Silicon Accelerometer'.

IBM Technical Disclosure Bulletin vol. 10, No. 8, Jan. 1968, New York US p. 1259 R. J. Wilfinger; R. A. Carballo 'Speech Coder Utilizing Semiconductor Cantilevers'.

CANTILEVER AND METHOD OF USING SAME TO DETECT FEATURES ON A SURFACE

This application is a continuation of application Ser. No. 07/954,695, filed Sep. 30, 1992, now U.S. Pat. No. 5,345,815, which is a continuation of application Ser. No. 07/638,163, abandoned.

This invention relates to apparatus and methods of forming microcantilevers for use in atomic force microscopes and other microscope systems.

BACKGROUND OF THE INVENTION

An atomic force microscope (AFM) scans over the surface of a sample. Typically, in the "contacting mode" of operation, a sharp tip is mounted on the end of a cantilever and the tip rides on the surface of a sample with an extremely light tracking force, on the order of $10^{-5}$ to $10^{-10}$ N. Profiles of the surface topography are obtained with extremely high resolution. Images showing the position of individual atoms are routinely obtained. In a second mode of operation, the tip is held a short distance, on the order of 5 to 500 Angstroms, from the surface of a sample and is deflected by various forces between the sample and the tip; such forces include electrostatic, magnetic, and van der Waals forces.

Atomic force microscopy is capable of imaging conductive as well as insulating surfaces with atomic resolution. Typical AFM's have a sensitivity of 0.1 Angstrom in the measurement of displacement, and a spring constant of about 1 Newton per meter (1 N/m). Further, the cantilever must be mounted so that the cantilever can approach and contact a sample.

Several methods of detecting the deflection of the cantilever are available which have sub-angstrom sensitivity, including vacuum tunneling, optical interferometry, optical beam deflection, and capacitive techniques. Optically operated AFM's, while very accurate, are more difficult to build and operate than the present invention because several optical components and fine alignments are required.

SUMMARY OF THE INVENTION

In summary, the present invention is a microminiature cantilever arm with a piezoresistive resistor at the fixed (base) end of the cantilever arm for use in imaging surface features of various objects. Deflection of the free end of the cantilever arm produces stress in the base of the cantilever. That stress changes the piezoresistive resistor's resistance at the base of the cantilever in proportion to the cantilever arm's deflection. Resistance measuring apparatus is coupled to the piezoresistive resistor to measure its resistance and to generate a signal corresponding to the cantilever arm's deflection.

The microminiature cantilever is formed on a semiconductor substrate. The cantilever arm is doped to form an electrically separate U-shaped piezoresistive resistor. The U-shaped resistor has two legs oriented parallel to an axis of the semiconductor substrate having a non-zero piezoresistive coefficient. A metal layer is deposited over the semiconductor's surface and patterned to form an electrical connection between the piezoresistive resistor and a resistance measuring circuit, enabling measurement of the piezoresistive resistor's resistance. The semiconductor substrate below said cantilever arm is substantially removed so as to form a cantilevered structure, and a tip is connected to the free end of the cantilever arm to facilitate the structure's use in an atomic force microscope.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
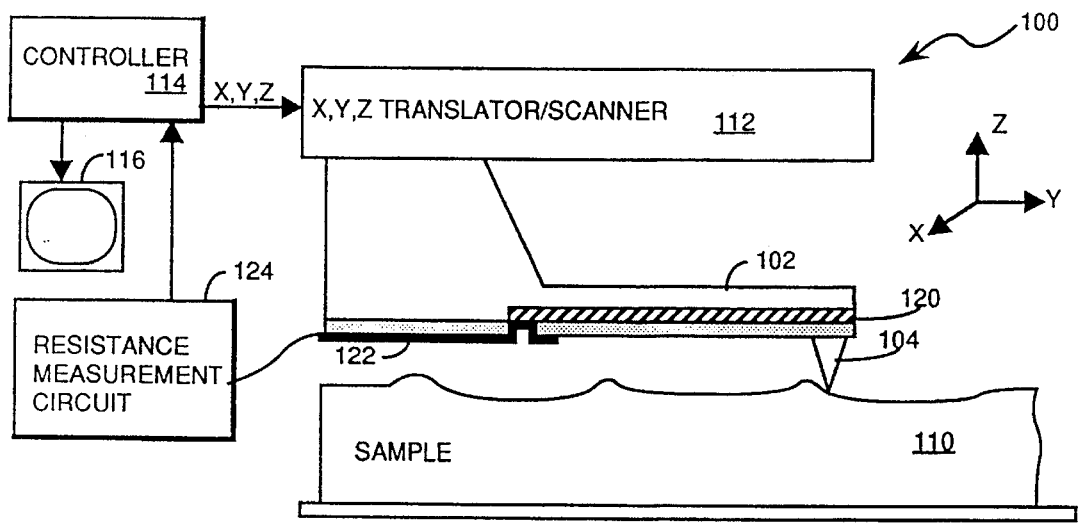
FIG. 1 is a conceptual block diagram of an atomic force microscope incorporating the present invention.

Referring to FIG. 1, there is shown a conceptual diagram of an atomic force microscope 100 incorporating the present invention. A microminiature cantilever arm 102 with a projecting tip 104 at its free end is used to probe the surface of a sample 110. Prior art atomic force microscopes (AFM's) keep the cantilever 102 stationary while an XYZ translator stage moves the sample 110 so as to scan the sample's surface. This prior art scanning method, in which the cantilever 102 is kept stationary and the sample 110 is moved so as to scan its surface, is required by the optical components of the prior art AFM's, but presents difficulties when the sample 110 is large.

An advantage of the present invention is that it allows scanning of a surface to be performed by moving the cantilever 102 rather than having to move the sample. In "constant force operation mode", movement of the XYZ translator/scanner 112 in the Z direction is controlled by a programmed microcontroller or computer 114, which uses information obtained from the cantilever as to the features on the sample's surface. The signal sent to monitor 116 is the same signal which is sent to the translator stage. In "constant Z operation mode" the cantilever is not moved along the Z direction and the information obtained from the cantilever is directly sent to the monitor 116.

Deflection of the cantilever 102 by surface features of the sample changes the resistance of piezoresistor 120 in the cantilever by an amount that is proportional to the cantilever's deflection. The piezoresistor 120 is coupled by metal connector 122 to a resistance measurement circuit 124. The resistance of the piezoresistor 120 is continuously monitored and measured by the measurement circuit 124. Typically, circuit 124 is a Wheatstone bridge circuit or any other conventional resistance measuring circuit. The circuit 124 produces measurement signals corresponding to the amount of deflection of the cantilever.

Figure 2:
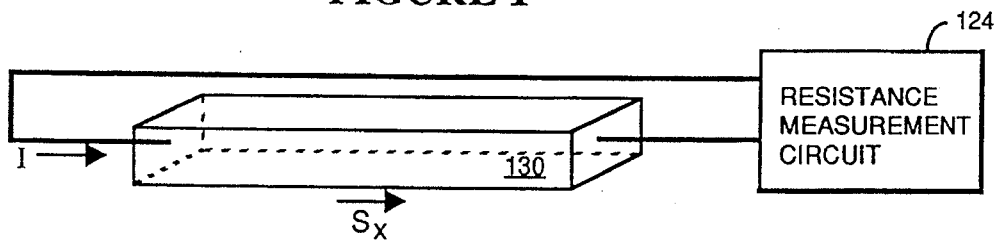
FIG. 2 is a block diagram of a piezoresistor and a resistance measurement circuit.
Figure 3:
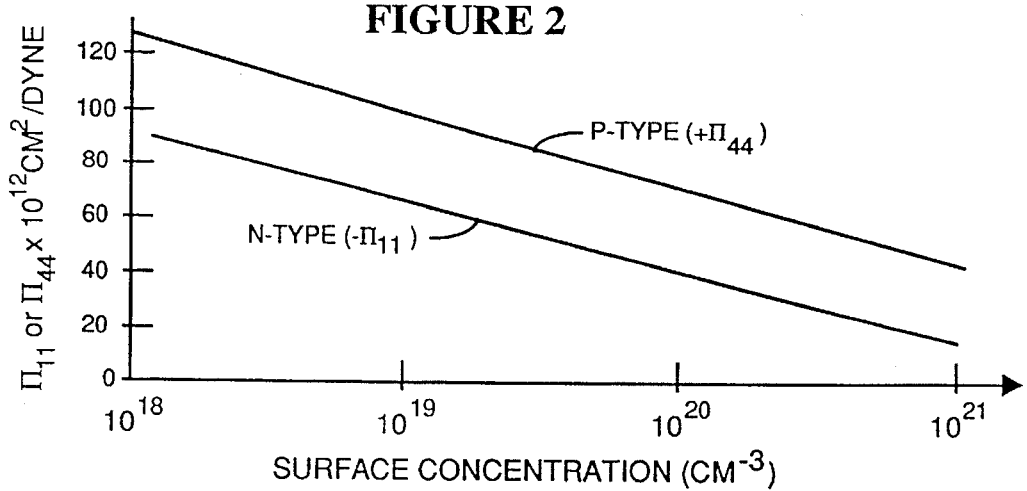
FIG. 3 is a graph showing the relationship between surface dopant concentrations in silicon semiconductors and the piezoresistive coefficient of silicon piezoresistors made from such materials.

Piezoresistivity is the effect by which, when stress is applied to a material, its resistance changes. In the case of a cantilever beam bent transversely, one coefficient, the so-called longitudinal piezoresistive coefficient, is sufficient to describe the piezoresistive properties of the beam. Referring to FIG. 2, consider a bar 130 of piezoresistive material that is electrically coupled to a resistance measurement circuit 124. If a stress is applied in the longitudinal direction x, then the resistance of the bar will change according to the expression:

$$\frac{\Delta R}{R_0} = \pi_L S_X$$

where $\Delta R$ is the variation in resistance, $R_0$ is the resistance with no applied stress, $\pi_L$ is the longitudinal piezoresistive coefficient, and $S_x$ is the stress applied along the direction x. The values of the longitudinal piezoresistive coefficient in silicon are given in Table 1 for different crystallographic orientations and for both p-type and n-type resistors in FIG. 3.

TABLE 1

| Longitudinal Direction | Longitudinal Coefficient | |
|---|---|---|
|  | $\pi_L$ n type | $\pi_L$ p type |
| 100 | $\pi_{11}$ | 0 |
| 111 | 0 | ⅔$\pi_{44}$ |
| 110 | ¼$\pi_{11}$ | ½$\pi_{44}$ |
| 112 | ¼$\pi_{11}$ | ½$\pi_{44}$ |

Figure 4:
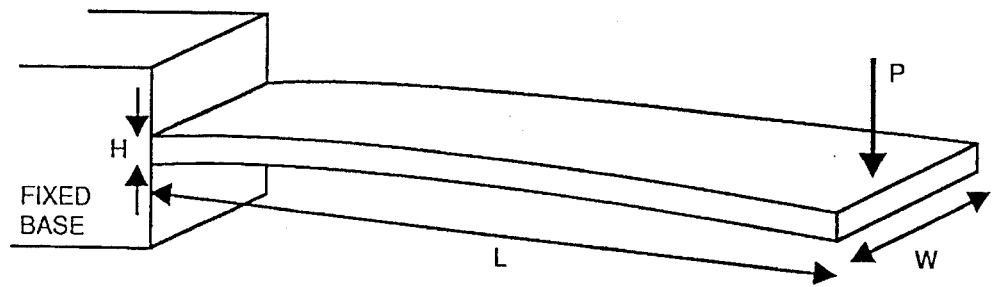
FIG. 4 depicts a piezoresistive cantilever beam under a load.

Referring to FIG. 4, consider a cantilever beam with a load P applied to the end of the beam. The upper half of the beam is subjected to tensile stress along its longitudinal direction, while the lower half of the beam is subjected to compressive stress. As a result, if the resistivity of the beam is uniform, first order variations in resistance will cancel out. Therefore, the resistor 120 must be defined near the surface of the cantilever, as shown in FIG. 1.

The resistor 120 shown in FIG. 1 experiences tensile stress while the body of the cantilever experiences compressive stress. Note that deflection of the free end of the cantilever arm produces stress primarily in the base of the cantilever. Given the configuration shown in FIG. 1, it can be shown that the variation in resistance of the piezoresistor 120 is:

$$\frac{\Delta R}{R_0} = \frac{3\pi_L L P}{H^2 W}$$

where $\Delta R$ is the variation in resistance, $R_0$ is the resistance with no applied stress, $\pi_L$ is the longitudinal piezoresistive coefficient, P is the load on the cantilever, L is the length of the cantilever, H is its thickness and W is its width.

To relate the load P to deflection $\Delta Z$ of the cantilever, one must determine the spring constant K of the cantilever:

$$K = \frac{EH^3 W}{4L^3} = \frac{P}{\Delta Z}$$

where E is the Young's modulus and $\Delta Z$ is the deflection of cantilever. Combining the above equations, one obtains the following relationship between deflection of the cantilever ($\Delta Z$) and change in the resistance of the piezoresistor 120:

$$\frac{\Delta R}{R_0} = \frac{3\pi_L E H \Delta Z}{4L^2}$$

Thus, as expected, changes in resistance are directly proportional to the amount of deflection $\Delta Z$ of the cantilever.

Figure 5:
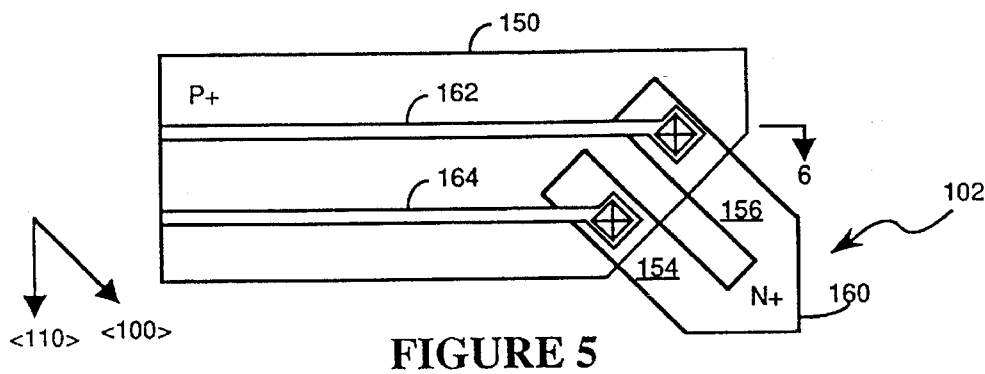
FIG. 5 depicts the layout of a first preferred embodiment of a microminiature piezoresistive cantilever.
Figure 6:
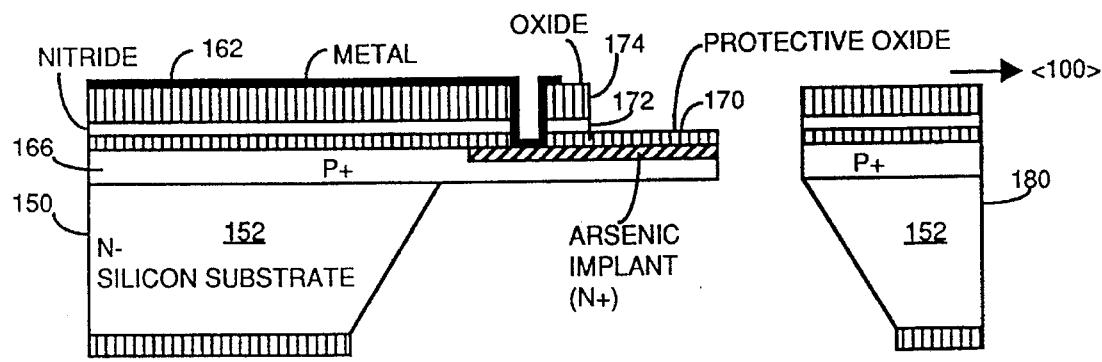
FIG. 6 depicts a cross-sectional view of the microminiature piezoresistive cantilever shown in FIG. 5.

FIG. 5 depicts the layout of a first preferred embodiment of a microminiature piezoresistive cantilever and FIG. 6 shows a cross-sectional view of the same cantilever. The cantilever arm 102 is connected at one end to a base 150. The base 150 is a portion of a semiconductor substrate 152. As shown, the cantilever arm 102 is a U-shaped structure having two piezoresistive legs 154 and 156 oriented along a <100>axis of the silicon crystal in which the cantilever arm 102 was formed. A U-shaped piezoresistor 160 is used so that it can be easily connected to a resistance measuring circuit 124 via a pair of metal connection lines 162 and 164. Note that the metal connection lines 162 and 164 are supported by the base 150 and therefore do not bend when the cantilever arm 102 bends.

The piezoresistor 160 on the cantilever arm 102 is an N+type region formed by an Arsenic implant. Looking at Table 1, it can be seen that the longitudinal piezoresistive coefficient for N-type silicon in the <100>direction is equal to $\pi_{11}$ (see FIG. 3). A cantilever with a piezoresistor parallel to the <100>axis maximizes the sensitivity of the piezoresistor to deflection of the cantilever (because it has the largest piezoresistive coefficient). In the preferred embodiments, the two arms of the piezoresistor 160 in the cantilever arm 102 are oriented parallel to a crystallographic (e.g., silicon crystal) axis having a non-zero piezoresistive coefficient. More generally, the direction of longitudinal stress when the cantilever arm 102 is bent must have a non-zero piezoresistive coefficient.

Above the N-type silicon substrate 152 is a P+ region 166, in which the N+ piezoresistor 160 has been formed. Oxide layer 170 protects the piezoresistor 160. Metal connections 162 and 164 sit above nitride layer 172 and top oxide layer 174. As shown, the metal contacts the piezoresistor 160 through a contact hole in the oxide-nitride-oxide sandwich structure 174-172-170.

Block 180 is a portion of the silicon wafer that is discarded after completion of the manufacturing process.

Figure 7:
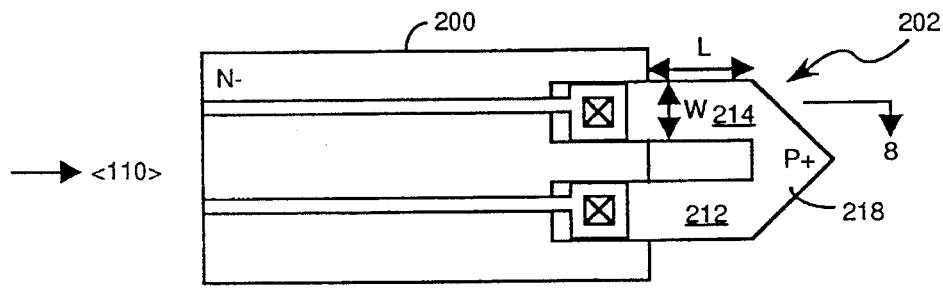
FIG. 7 depicts the layout of a second preferred embodiment of a microminiature piezoresistive cantilever.
Figure 8:
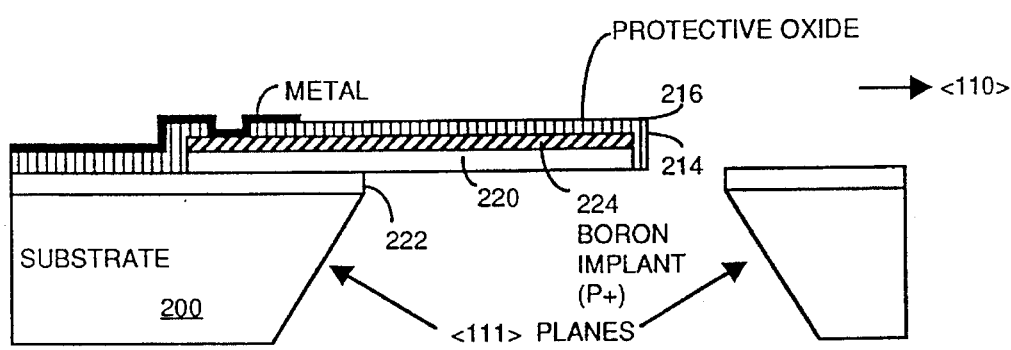
FIG. 8 depicts a cross-sectional view of the microminiature piezoresistive cantilever shown in FIG. 7.

FIGS. 7 and 8 depict the layout and cross-section of a second preferred embodiment of a microminiature piezoresistive cantilever. This second embodiment of the invention is formed using a silicon-on-insulator (SOI) substrate 200. Primary advantages of this embodiment are (1) the cantilever arm 202 is parallel to the base of the cantilever, which makes the cantilever easier to use, and (2) there are fewer processing steps required to manufacture this cantilever.

In this embodiment the two piezoresistive legs 212 and 214 on the cantilever arm 202 are formed from P-type silicon, and are oriented parallel to a <110>axis of the silicon crystal. This embodiment needs only one protective or insulating layer 216 above the substrate 200. The P- substrate 220 above the insulator layer 222 in the preferred embodiment is about 1.5 microns deep, and the piezoresistor itself (boron implant region 224) has a depth of about 0.4 microns. The protective oxide 216 above the piezoresistor typically has a thickness of 1000 to 2000 Angstroms (i.e., 0.1 to 0.2 microns). Finally, the insulator layer 222 typically has a thickness of about 1.0 micron.

Resonance Frequency of Cantilever. When making such cantilevers, the resonance frequency of the cantilever should be higher than 10 KHz to allow fast imaging (i.e., the cantilever must quickly follow the topography of the sample).

For a cantilever of length L, height H, Young's modulus E and density p, the resonance frequency Fr is:

$$Fr = 0.162 \frac{H}{L^2} \sqrt{\frac{E}{\rho}}$$

For silicon, Young's modulus is $E = 1.9 \times 10^{11} N/m^2$ and the density is $\rho = 2.3 \times 10^3 kg/m^3$. Using a cantilever thickness of 0.5 μm, any cantilever length of up to about 100 μm will result in a resonance frequency above 100 KHz.

Sensitivity/Noise. A sensitivity of 1 angstrom in a 1 KHz bandwidth is required to demonstrate atomic resolution on some surfaces. The sensitivity of the cantilevers of the present invention is limited by the signal to noise ratio in the resistor, given by the Johnson noise Vn as follows:

$$Vn = (4k_B T R_0 \Delta f)^{0.5}$$

where $k_B$ is Boltzman's constant, T is the temperature, $R_0$ is the resistance of the cantilever when no stress is applied, and $\Delta f$ is the bandwidth of measurement. The 1 angstrom sensitivity requirement turns out to be possible, but requires strict limitations on the dimensions of the cantilever. Note that $R_0$ is proportional to the length of the cantilever L and is inversely proportion to its width W. Design parameters (i.e., H, L, W, $R_0$) must be selected to maximize $\Delta R/R_0$ for a given spring constant of the cantilever and displacement.

CANTILEVER MANUFACTURING PROCESS

Figure 9:
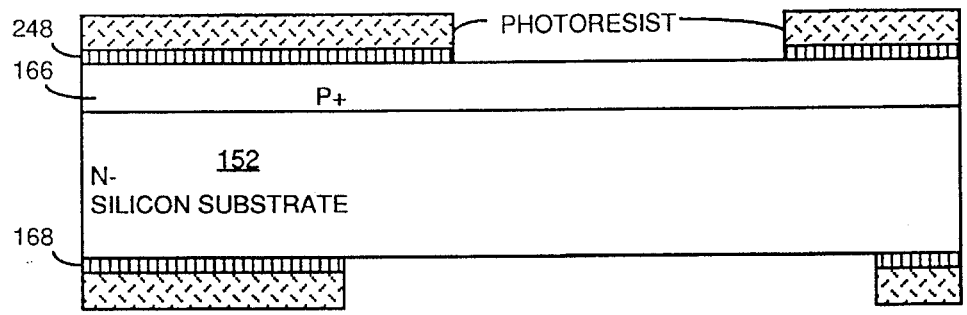
FIGS. 9–13 depict the process of manufacturing the cantilever arm shown in FIGS. 5 and 6.

Referring to FIG. 9, the cantilever arm of FIGS. 5 and 6 is manufactured as follows. The starting material is a <100>n-type Phosphorus doped, 10–20 Ωcm silicon wafer 152, herein called the substrate. The first step is to implant Boron ions into the entire surface of the substrate (e.g., with energy 180 KeV, dose $6 \times 10^{15}$) So as to generate a P+ region 166 that is about 0.7 microns deep. Then layers (e.g., 4000 Å) of low temperature silicon oxide 168 and 248 are deposited on both sides (top and bottom) of the entire wafer.

The next step is a double photolithography step, one on the top side and one on the bottom side, and therefore top side to bottom side alignment is required. Photoresist is deposited on both sides of the wafer, top and bottom masks are aligned, and then the wafer is inserted between the aligned masks. Both masks define regions where the deposited oxide layers 168 and 248 will be removed. The top mask also defines where Arsenic will be implanted. The photoresist on both sides is exposed and developed, and then an oxide etch is performed to produce the profile shown in FIG. 9.

Figure 10:
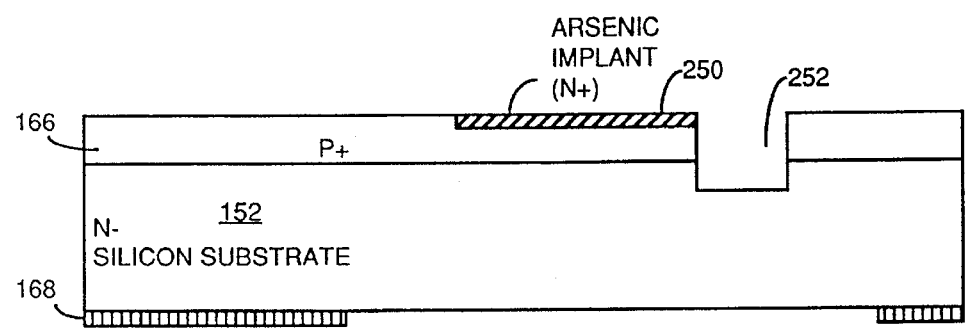

Referring to FIG. 10, the next step is to implant Arsenic through the window in the top layer of oxide 248 to create a N+region 250 that is about 0.3 microns deep. Next, another mask is defined by applying and then exposing photoresist using a mask that defines the boundaries of the cantilever. Then uncovered portions of the oxide layer 248 are etched, followed by etching 1.5 microns of silicon below the etched portions of the oxide layer to produce a notch 252 projecting into the substrate 152.

Next the photoresist is removed using conventional techniques, new photoresist is applied to the bottom side of the wafer, and then all the oxide on the top side of the wafer is etched away to produce the profile shown in FIG. 10.

A brief annealing step is used to repair implant damage and to activate the implanted carriers.

Figure 11:
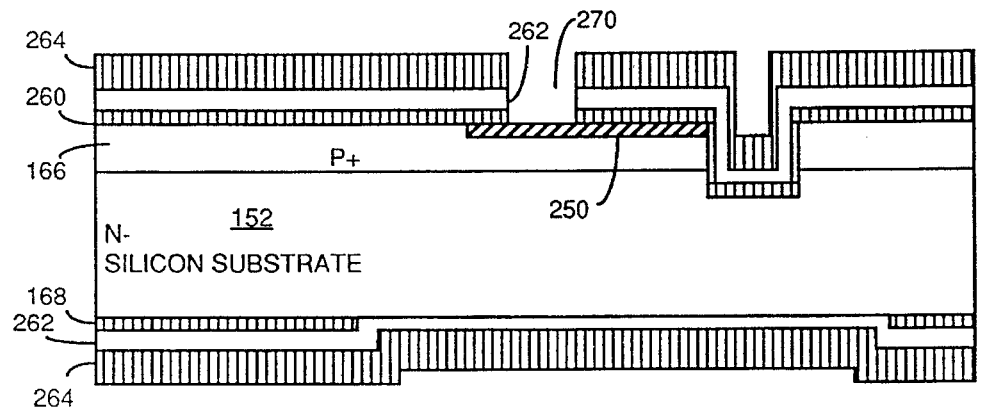

Referring to FIG. 11, next, a sandwich of three layers is deposited. First a layer 260 of about 700 Å of low temperature silicon oxide is deposited on the top side of the wafer, followed by about 1100 Å of low stress silicon nitride 262 which are deposited on both sides of the wafer, followed by 1 micron of low temperature silicon oxide 264 also deposited on both sides of the wafer. The sandwich structure is designed so that it is possible to preserve a thin layer of silicon oxide on top of the cantilever for protection.

The oxide-nitride-oxide sandwich structure on the top side of the wafer is patterned and etched using standard photolithography and etching steps to produce a contact hole 270 as shown in FIG. 11.

Figure 12:
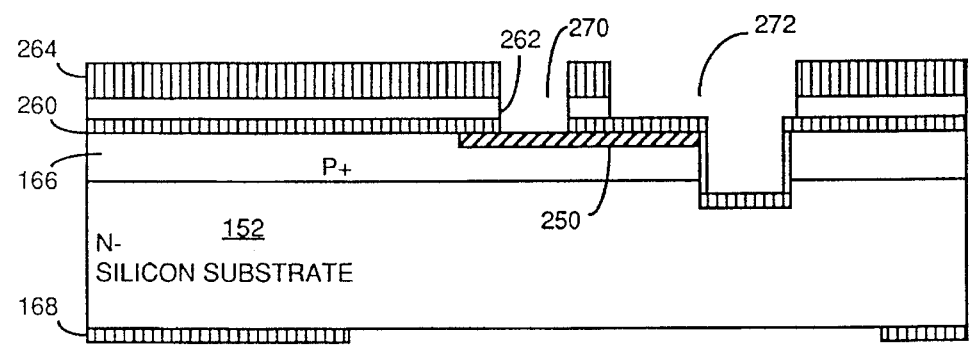

Referring to FIG. 12, another photoresist layer is applied and developed on the top side of the wafer, with a protective photoresist applied on the bottom side of the wafer, followed by a long oxide etch and then a nitride etch to remove the top oxide layer 264 and the underlying nitride layer 262 in region 272. After removing all photoresist, a protective photoresist is applied to the top side of the wafer, followed by oxide and nitride etches of the oxide and nitride layers 264 and 262 on the bottom side of the wafer. A cross section of the wafer at this point is shown in FIG. 12.

Figure 13:
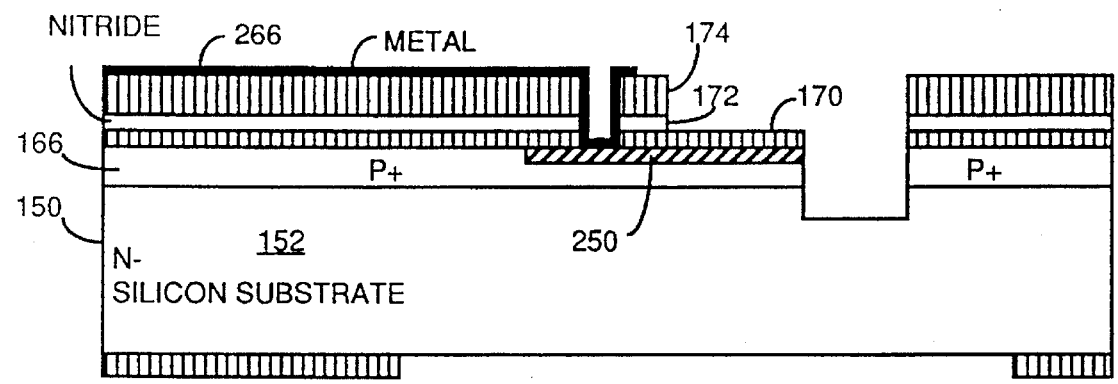

Referring to FIG. 13, a metal layer 266 is sputtered onto the wafer and patterned using standard photolithography techniques to produce metal connections to the piezoresistor. Then the top side of the wafer is coated with polyimide and the silicon substrate is wet etched from the back side until all silicon below the boron implant region 166 has been removed. The wet silicon etching process automatically stops when it encounters a boron concentration of around $7 \times 10^{19} cm^{-3}$. In the first preferred embodiment, this concentration of boron is found at a depth of about 0.6 microns. The resulting cross section of the wafer is shown in FIG. 6.

When wet etching the silicon wafer from its bottom side it is only possible to open windows which are oriented along <110> directions. As a result, the cantilever in this embodiment must be at a 45 degree angle with respect to the opening.

Process for Manufacturing. Second Preferred Embodiment.

Figure 14:
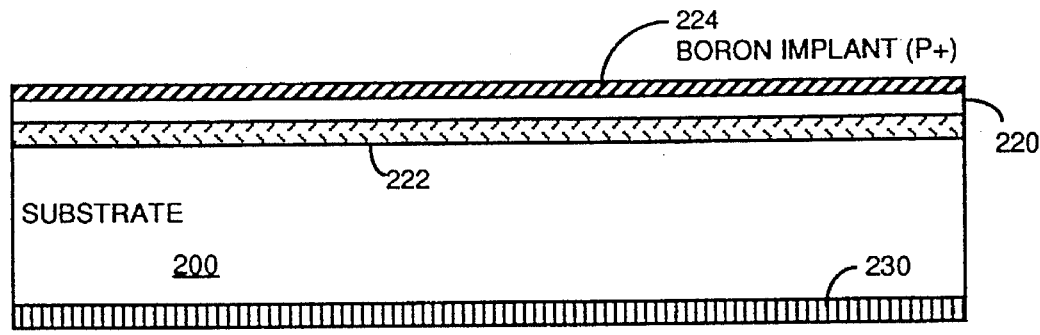
FIGS. 14–17 depict the process of manufacturing the cantilever arm shown in FIGS. 7 and 8.

Referring to FIGS. 14 through 17, the process for making the second preferred embodiment of a piezoresistive microminiature cantilever, as shown in FIGS. 7 and 8, is as follows. The starting material is a silicon-on-insulator wafer 200 with a 1.5 micron thick <100> p-type silicon layer 220 above the insulator layer 222. The thickness of the top silicon layer 220 determines the thickness of the cantilever. Both the top silicon layer 200 and the substrate 200 are <100>oriented. The first step of the manufacturing process is to grow an oxide on both the front and back sides of the wafer, to strip it off the front side and to blanket implant boron on the front side to a depth of about 0.4 microns to create P+ region 224. FIG. 14 shows a cross section of the wafer at this stage of the process.

Figure 15:
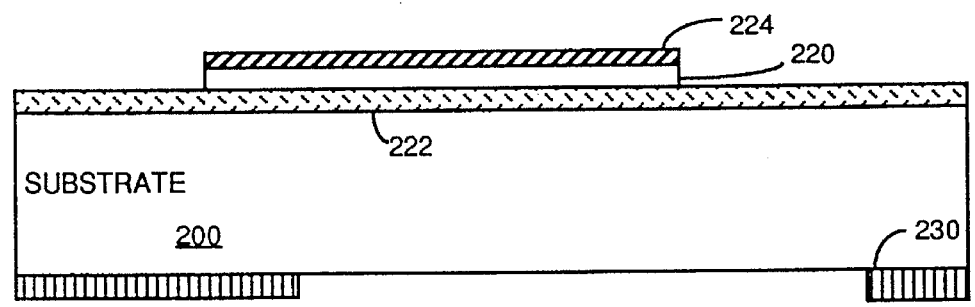

The next step is a double photolithography step, one on the front side and one on the back side of the wafer. On the back or bottom side a large window is opened in the oxide 230. On the top side, using photoresist as a mask, the top silicon layer 220 is etched down to the insulating oxide layer 222. FIG. 15 shows a cross section of the wafer after removing the photoresist.

Figure 16:
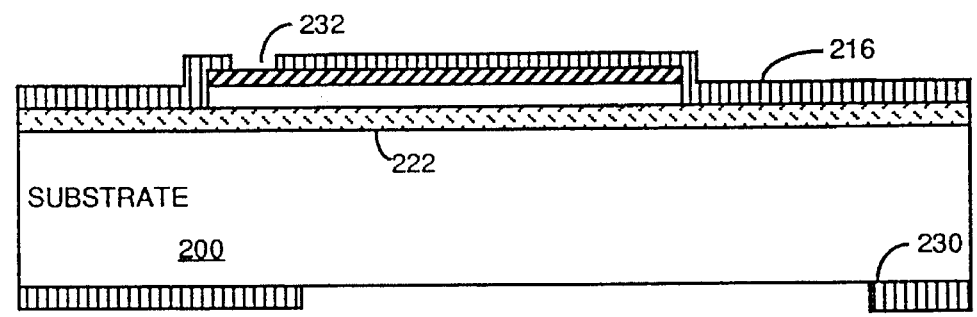

A thin oxide layer 216 is grown or deposited on the wafer, followed by a photolithography step, which opens contact hole 232 in that oxide layer 216, as shown in FIG. 16.

Figure 17:
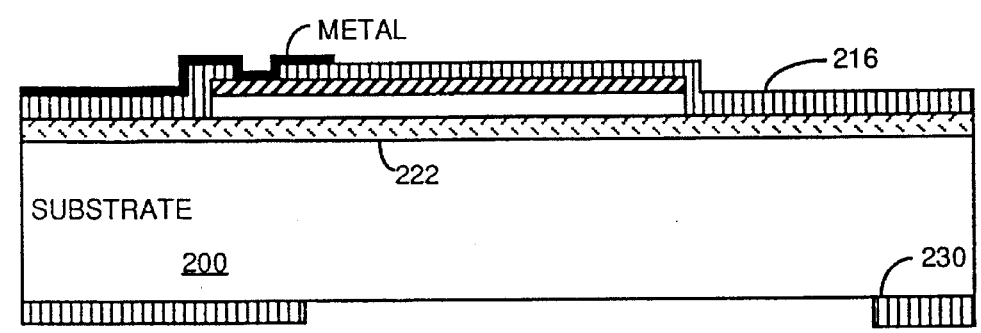

At this point metal, typically aluminum/silicon, is sputtered onto the front side of the wafer. Using a fourth and last lithography step, metal lines are defined to connect the cantilever resistor to pads. At this point the cross section of the wafer is shown in FIG. 17.

Finally, the top side of the wafer is coated with polyimide and the silicon substrate is wet etched from the back side using a preferential silicon etchant solution. The properties of such a solution are that it etches <100>Si planes much faster than <111>planes and that it etches oxide at a negligible rate. At completion of the silicon etch, oxide is removed from the back side of the wafer, including exposed portions of the insulator layer 222, and polyimide is stripped from the front side to produce the cross section shown in FIG. 8.

While the present invention has been described with reference to a few specific embodiments, the description is illustrative of the invention and is not to be construed as limiting the invention. Various modifications may occur to those skilled in the art without departing from the true-spirit and scope of the invention as defined by the appended claims. In general, piezoresistive cantilevers in accordance with the present invention, suitable for use in AFMs and profilometers, will have a low spring constant (e.g., less than 10 N/m), so that the cantilever will not deform the surface being scanned, and will have a sensitivity ranging between 0.1 and 100 Angstroms, depending on the application.

What is claimed is:

1. A cantilever structure for use in an atomic force microscope, the cantilever structure comprising:

a cantilever arm having a fixed end and a free end and a piezoresistive element included within the cantilever arm, deflection of the free end of the cantilever arm changing the resistance of the piezoresistive element;

a tip projecting from the cantilever arm near the free end thereof;

the cantilever arm having a mechanical resonant frequency greater than 10 KHz.

2. The cantilever structure of claim 1 wherein the cantilever arm comprises a semiconductor material and the piezoresistive element comprises a doped region within the semiconductor material.

3. The cantilever structure of claim 2 wherein the semiconductor material comprises silicon.

4. A method of detecting features on the surface of a sample, the method comprising the following steps:

(a) providing a cantilever arm, the cantilever arm having a resonant frequency greater than 10 KHz and including a piezoresistive element and a tip, the tip being located near a free end of the cantilever arm;

(b) bringing the cantilever arm and sample together, until the tip of the cantilever arm is within 500 Å or less of the surface of the sample;

(c) moving the sample and the cantilever arm with respect to each other in a direction generally parallel to the surface of the sample; and (d) detecting changes in the resistance of the piezoresistive element as the cantilever is deflected in response to features of the surface of the sample.

5. The method of claim 4 wherein the tip of the cantilever is in contact with the surface of the sample during step (c).

6. A method of detecting features on the surface of a sample, the method comprising the following steps:

(a) providing a cantilever arm, the cantilever arm having a resonant frequency greater than 10 KHz and including a piezoresistive element and a tip, the tip being located near a free end of the cantilever arm;

(b) bringing the cantilever arm and sample together, until the tip of the cantilever arm is within 500 Å or less of the surface of the sample;

(c) moving the sample and the cantilever arm with respect to each other in a direction generally parallel to the surface of the sample, the tip of the cantilever being held at a distance greater than 5 Å from the sample; and (d) detecting changes in the resistance of the piezoresistive element as the cantilever is deflected in response to features of the surface of the sample.

7. A method of detecting features on the surface of a sample, the method comprising the following steps:

(a) providing a cantilever arm, the cantilever arm having a resonant frequency greater than 10 KHz and including a piezoresistive element and a tip, the tip being located near a free end of the cantilever arm;

(b) bringing the cantilever arm and sample together, until the tip of the cantilever arm is within 500 Å or less of the surface of the sample;

(c) moving the sample and the cantilever arm with respect to each other in a direction generally parallel to the surface of the sample;

(d) detecting changes in the resistance of the piezoresistive element as the cantilever is deflected in response to features of the surface of the sample; and (e) varying the distance between the cantilever and the surface in response to changes in the resistance of the piezoresistive element.

* * * * *